United States Patent [19]

Roseman

[11] 3,758,138

[45] Sept. 11, 1973

[54] TUBE CONNECTION FOR FLUID HANDLING APPARATUS

[76] Inventor: Richard J. Roseman, 72 Stafford Rd., Colonia, N.J.

[22] Filed: Oct. 21, 1971

[21] Appl. No.: 191,245

[52] U.S. Cl............. 285/158, 285/137 R, 285/176, 285/305, 137/625.69, 251/367
[51] Int. Cl............................. F16l 3/04, F16l 5/00
[58] Field of Search................... 285/137 R, 158, 8, 285/189, 332, 334.4, 176, 177, 305; 137/270, 271, 625.69; 251/145, 146

[56] References Cited
UNITED STATES PATENTS

| | | | |
|---|---|---|---|
| 1,005,356 | 10/1911 | Swift | 285/8 X |
| 1,856,072 | 5/1932 | Gordon | 285/332 X |
| 2,024,873 | 12/1935 | Perry | 285/334.4 X |
| 3,215,456 | 11/1965 | Schmid | 285/332 X |
| 3,408,092 | 10/1968 | Appleton | 285/158 X |

Primary Examiner—Henry T. Klinksiek
Attorney—Harry B. Rook

[57] ABSTRACT

In fluid handling apparatus, a block has a chamber and ports opening from said chamber through one side of the block, a support plate has a hole alined with each port, a connector for a flexible tube is located in each hole and is formed at one end for connection thereto of a flexible tube and has at its other end a head clamped between said support plate and said side of the block with a fluid-tight joint.

1 Claim, 8 Drawing Figures

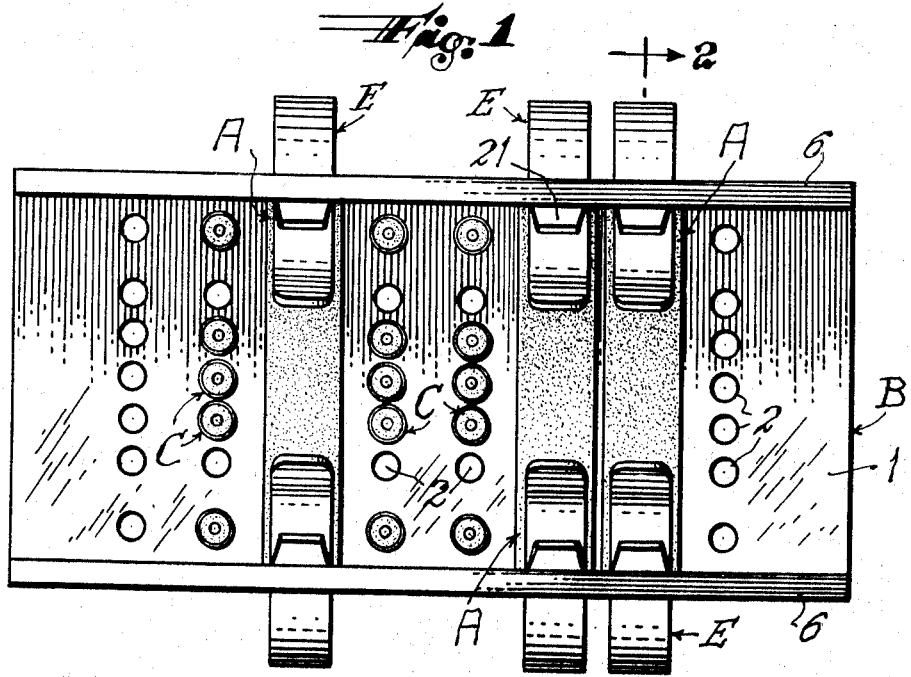
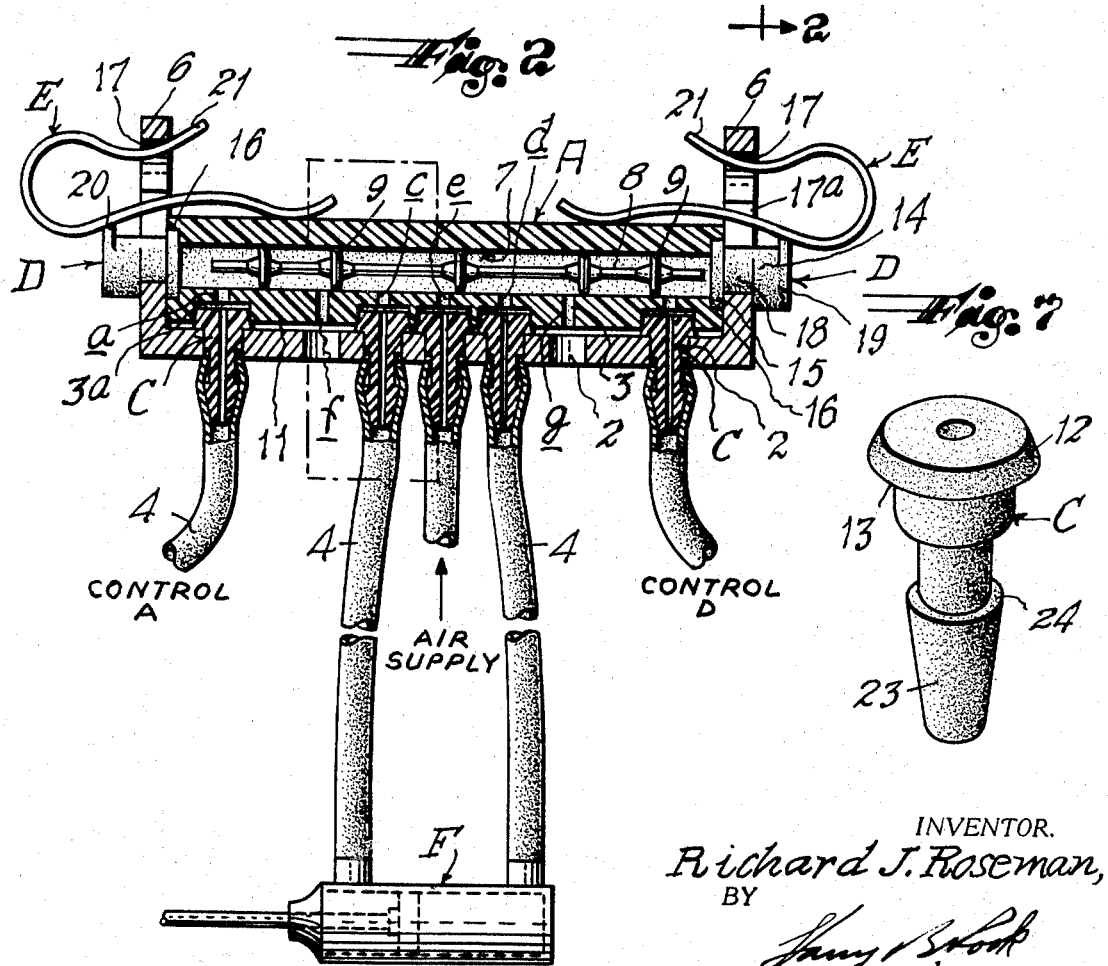

PATENTED SEP 11 1973 3,758,138
SHEET 2 OF 2
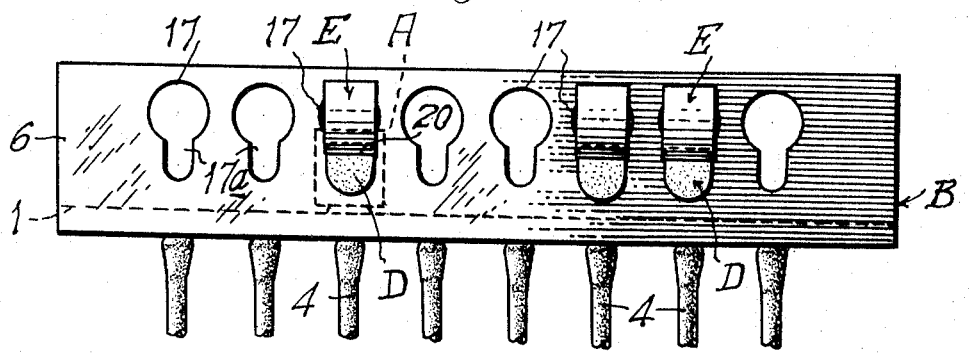
Fig. 3
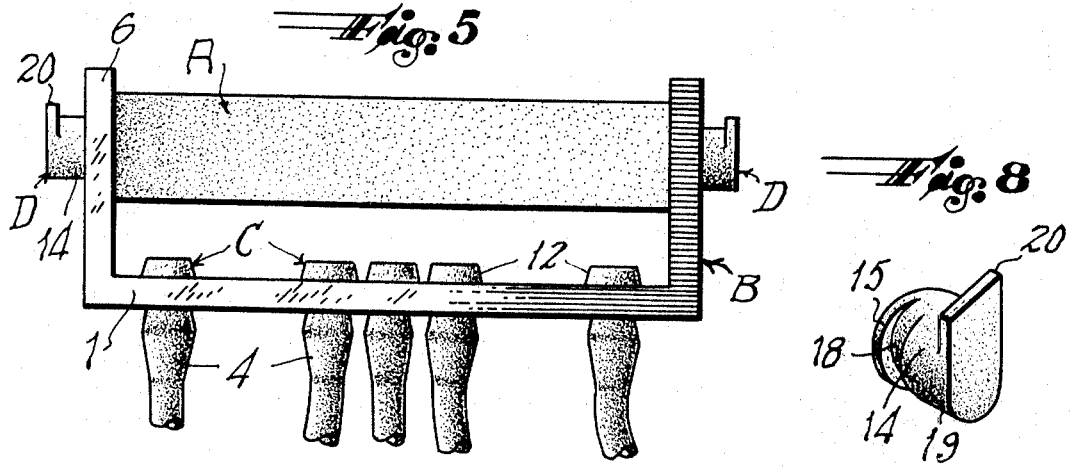
Fig. 5
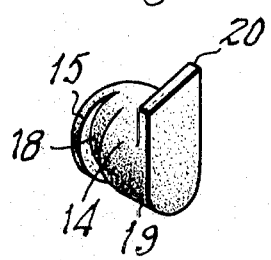
Fig. 8
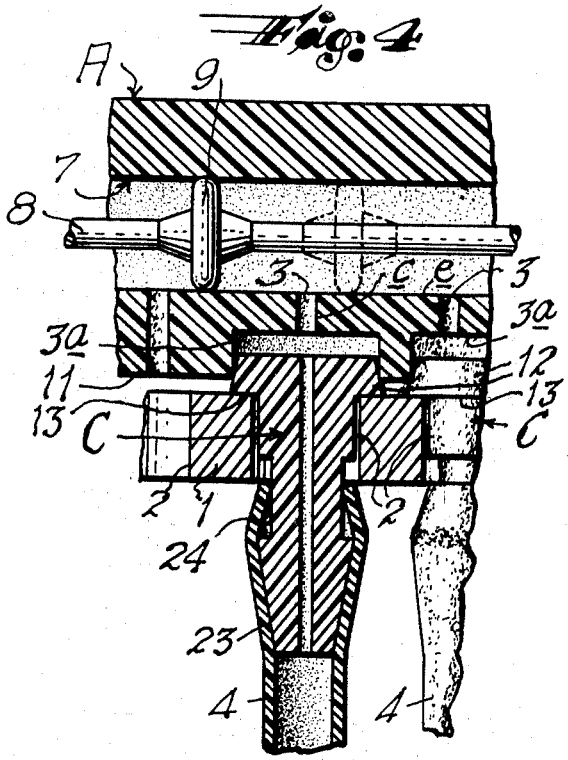
Fig. 4
Fig. 6
INVENTOR.
Richard J. Roseman,
BY
Harry Blook,
ATTORNEY

TUBE CONNECTION FOR FLUID HANDLING APPARATUS

BACKGROUND OF THE INVENTION

1. Field of the Invention

The invention is related in general to the art of fluid handling and control devices.

2. The Prior Art

Fluid handling and control devices of the prior are comprise blocks, for example valve bodies, having chambers therein and flexible and resilient tubes connected thereto for conducting or controlling flow of fluid from a supply under low pressure to, for example, fluid pressure operated mechanisms.

However, the connections of the tubes to the chambered blocks in the prior art devices leave much to be desired in that either they are cumbersome or are difficult to assemble or are too expensive, or cannot be relied upon to provide a fluid-tight connection between the block and the flexible tubes.

SUMMARY OF THE INVENTION

The primary object of the present invention is to provide a chambered fluid handling block, such as a valve body, and a flexible tube connector therefor which overcomes the objections to and disadvantages of the prior art devices and which is small, compact and easy to assemble, ensures a fluid-tight connection between the block and flexible tubes and is relatively inexpensive.

The invention especially contemplates a novel and improved combination of an elongated block or valve body having a longitudinal chamber and an approximately flat side through which a plurality of ports open from said chamber, a plurality of flexible tubes having limited inherent elasticity, a support plate having holes each alined with one of said ports, and a connector for each tube located in one of said holes and to one end of which the tube is frictionally and elastically connected and whose other end has a head clamped between said support plate and said side of the block with a fluid tight joint.

It is another object of the invention to provide a novel and improved connector comprising a shank which is easily and quickly insertable through a hole in a support plate and has at its ends respectively a head to be clamped between said plate and a chambered block and a tapered portion flaring inwardly from its extremity to a circumferential shoulder over which the end of a flexible elastic tube can be stretched with a fluid-tight fit.

BRIEF DESCRIPTION OF THE DRAWINGS

For the purpose of explaining the principles of the invention, it has been shown as embodied in a valve mechanism for a complete understanding of which reference should be had to the following description in conjunction with the accompanying drawings wherein:

FIG. 1 is a top plan view of a plurality of valve mechanisms embodying the invention, mounted on a common support plate;

FIG. 2 is an enlarged vertical longitudinal sectional view approximately on the plane of the line 2—2 of FIG. 1;

FIG. 3 is a side elevational view of the valve mechanisms and support plate shown in FIG. 1;

FIG. 4 is an enlargement of the portion of FIG. 2 enclosed within the dot and dash lines;

FIG. 5 is an end elevation of the mechanism showing the position of the valve block in the support plate preliminary to the pressing of the block into the clamping relation to the connectors shown in FIG. 2;

FIG. 6 is a fragmentary side elevation of the mechanism on a reduced scale showing the valve block in dotted lines in the position shown in FIG. 5;

FIG. 7 is a greatly enlarged perspective view of one of the connectors, and

FIG. 8 is an enlarged perspective view of one of the plugs for closing the end of the longitudinal opening in the valve block and for connecting the valve block to the support plate.

DESCRIPTION OF THE PREFERRED EMBODIMENTS

Specifically describing the invention, several of the valve mechanisms A are shown as mounted on a common support plate B the main portion 1 of which is shown as having a plurality of holes 2 for connectors C which are utilized for connecting ports 3 of the valve block to flexible tubes 4 which serve for conducting fluid under pressure between the valve and devices for controlling actuation of the valve or devices controlled by the valve.

While the specific construction of the valve blocks A and the support plate may be varied according to the conditions under which they are to be used, valve blocks are here shown as being elongated and rectangular in cross-section and of a length approximately corresponding to the distance between the inwardly facing surfaces 5 of flanges 6 extending upwardly from the main portion 1 of the support plate. Each block has a valve chamber 7 extending longitudinally thereof and with its ends opening through the ends of the block; and within the valve chamber is mounted a slide valve 8 of generally known spool-type construction having valve rings 9 for controlling valve ports 3 each of which is in approximate axial alignment with one of the holes 2 in the support plate. Each port 3 has an enlarged outer end portion 3a opening through the bottom side edge of the valve block and into which is adapted to fit the head 12 of one of the connectors C.

The side wall of the portion 3a of each port and the peripheral surface of the head 12 of each connector frictionally engage each other and one thereof, preferably said head is frusto-conical to ensure a fluid tight joint when the valve block is secured in the support plate with a shoulder 13 on the head abutting the upper surface of the main portion 1 of the support plate as best shown in FIGS. 2 and 4.

For mounting and securing each valve block on the support plate, there is shown a plug D formed of resilient material, such as rubber, closing each end of the valve chamber 7 in the valve block, and each plug has a separable connection with the support plate. Each plug has a shank 14 at one end of which is a circumferential flange 15 seated in a recess 16 in the valve block at the end of the valve chamber.

The plugs D of each valve block coact with keyhole slots 17 in the flanges 6 of the support plate. The keyhole slot in each flange is directly opposite or in axial alignment with the slot in the other flange and its segmentally circular upper portion is of a diameter slightly greater than the diameter of the flange 15 of the plug, and the narrow portion 17a of each slot is adapted to frictionally receive a reduced neck portion 18 on the plug which is disposed between the corresponding flange 15 and the head 19 of the plug.

For assembling the block in the support plate, after the connectors C have been fitted into their respective holes 2, the ends of the valve chamber 7 are brought into axial alignment with the segmentally circular portions of the corresponding keyhole slots as shown in FIG. 5 and by dotted lines in FIG. 6, whereupon the flanges 15 of the plugs are seated in the recesses 16 of the valve block through the keyhole slots. The block and the plugs are then pressed at the same time downwardly so that the necks of the plugs slide into the narrow portions 17a of the slots and the heads of the connectors are clamped between the surface 11 of the valve block and the top surface of the main portion 1 of the support plate as best shown in FIG. 2. Then a spring clip E has its ends pressed through each keyhole slot with one leg portion pressing downwardly on the top of the valve block and on a flat bearing surface 20 on the head of the corresponding plug while the other arm of the clip engages the upper end of the keyhole slot. Preferably the free end of the second-mentioned arm of the clip extends upwardly behind the corresponding flange 6 as indicated at 21, thereby to yieldingly hold the clip against being accidentally displaced.

The number of ports in the valve block may be widely varied depending upon the number of fluid devices associated therewith, but as shown the ports $a$ and $b$ are disposed at opposite ends of the valve chamber for connection to devices for controlling the flow of fluid under pressure to and from the corresponding ends of the valve for actuating the valve. Ports $c$ and $d$ are connected to opposite ends of a piston and cylinder device F to and from which flow of fluid under pressure through an intermediate port $e$ is controlled by the valve. Some of the ports, here specifically $f$ and $g$ are exhaust ports so that when fluid is admitted to one end of the device F, other fluid is simultaneously exhausted or vented from the other end of the device through one or the other exhaust ports $f$ and $g$.

An important feature of the invention is the connector C having the head 12 to enter one of the ports and to be clamped between the valve block and the support plate with its shank extending through one of the holes 2 in the support plate and formed at its other end to receive one end of a flexible tube 4 with a fluid tight joint. Preferably the connector is formed of plastic material and the second-mentioned end has a tapered portion 23, flaring inwardly, preferably frusto-conically to a circumferential shoulder 24.

The invention thus provides a simple and relatively inexpensive tube connection for a chambered block in a fluid handling apparatus which is small, compact, easy to assemble and ensures a fluid-tight connection between the block and flexible tubes for use in association with a large number of fluid operated or fluid controlled devices.

I claim:

1. For use in fluid handling apparatus, a chambered block having a port, a connector and a support plate therefor, and a flexible plastic tube connected thereby to said port, said connector comprising a shank insertable through a hole in said support plate and whose end portions respectively are a truncated conical head frictionally insertable into said port with a fluid tight fit and to be clamped between said support plate and said block and a frusto-conical portion extending inwardly of the shank with its larger end providng a circumferential shoulder over which the end of said flexible elastic tube is stretched with a fluid tight joint.

* * * * *